US012468086B1

(12) United States Patent
Lin et al.

(10) Patent No.: US 12,468,086 B1
(45) Date of Patent: Nov. 11, 2025

(54) SILICON NITRIDE-TO-SILICON WAVEGUIDE ASSEMBLY FOR BROADBAND COMMUNICATION INCLUDING CONCURRENT PROPAGATION BY TE0 AND TM0 MODES

(71) Applicant: Marvell Asia Pte Ltd, Singapore (SG)

(72) Inventors: Nathan Lin, San Jose, CA (US); Yun Wang, Ottawa (CA); Jie Lin, Cupertino, CA (US)

(73) Assignee: Marvell Asia Pte Ltd, Singapore (SG)

( * ) Notice: Subject to any disclaimer, the term of this patent is extended or adjusted under 35 U.S.C. 154(b) by 322 days.

(21) Appl. No.: 18/116,140

(22) Filed: Mar. 1, 2023

Related U.S. Application Data (60) Provisional application No. 63/316,011, filed on Mar. 3, 2022.

(51) Int. Cl.
*G02B 6/12* (2006.01)
*G02B 6/02* (2006.01)
*G02B 6/122* (2006.01)
*G02B 6/125* (2006.01)

(52) U.S. Cl.
CPC ........... *G02B 6/12004* (2013.01); *G02B 6/02* (2013.01); *G02B 6/1228* (2013.01); *G02B 6/125* (2013.01); *G02B 2006/12061* (2013.01)

(58) Field of Classification Search
CPC .... G02B 6/12004; G02B 6/02; G02B 6/1228; G02B 6/125
See application file for complete search history.

(56) References Cited

U.S. PATENT DOCUMENTS

| | | | | |
|---|---|---|---|---|
| 9,195,001 | B2* | 11/2015 | Hatori | G02B 6/036 |
| 9,417,388 | B2* | 8/2016 | Yamasaki | G02B 6/305 |
| 10,345,522 | B2* | 7/2019 | Daniel | G02B 6/1228 |
| 10,564,353 | B2* | 2/2020 | Chetrit | H01P 11/006 |
| 2009/0297093 | A1* | 12/2009 | Webster | G02B 6/1228 |
| | | | | 264/1.25 |

(Continued)

OTHER PUBLICATIONS

Sodagar et al, "High-efficiency and wideband interlayer gratings couplers in multilayer Si/SlO2/SiN platform for 3D integration of optical functionalities." Optics Express 16767 (2014).

(Continued)

*Primary Examiner* — Tina Wong (57) ABSTRACT

A waveguide assembly includes first and second waveguides. The first waveguide includes silicon, first and second ends, an end member, and a tapered member. The end member extends from the first end. The tapered member extends from the end member to the second end. The second waveguide is optically coupled to and spaced away from the first waveguide. The second waveguide includes silicon nitride, first and second members, and a non-tapered member. The non-tapered member extends from the first member to the second member and in parallel with and opposing the tapered member. An effective refractive index of the non-tapered member matches an effective refractive index of the tapered member at a first plane. The first plane extends through the non-tapered member and the tapered member and perpendicular to a second plane. The second plane extends parallel to a direction of overlap between the first and second waveguides.

30 Claims, 9 Drawing Sheets

(56) References Cited

U.S. PATENT DOCUMENTS

2018/0120504 A1* 5/2018 Qi ..................... G02B 6/3636

OTHER PUBLICATIONS

Suzuki et al, "Ultralow crosstalk and Broadband Multi-Port Optical Switch using SlN/Si double-layer platform" Opto-Electronics and Communications Conference (OECC) and Photonics Global Conference (2017).
Huang et al, "CMOS compatible monolithic multi-layer Si3N4-on-SOI platform for low-loss high performance silicon photonics dense integration" Optics Express 21859 (2014).
Konoike et al et al, "SIN/Sl double-layer planform for ultralow-crosstalk multiport optical switches" Optics Express 21130 (2019).
Sacher et al, "Tri-layer silicon nitride-on-silicon photonic platform for ultra-low-loss crossings and interlay transitions" Optics Express 30862 (2017).

* cited by examiner

SILICON NITRIDE-TO-SILICON WAVEGUIDE ASSEMBLY FOR BROADBAND COMMUNICATION INCLUDING CONCURRENT PROPAGATION BY TE0 AND TM0 MODES

CROSS-REFERENCE TO RELATED APPLICATIONS

This application claims the benefit of U.S. Provisional Application No. 63/316,011, filed on Mar. 3, 2022. The entire disclosures of the applications referenced above are incorporated herein by reference.

FIELD

The present disclosure relates to waveguides, and more specifically to silicon nitride-to-silicon strip waveguides.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Broadband communication systems can include silicon photonics systems that are to satisfy different bandwidth, signal-to-noise ratio, and power requirements for short-reach, metro, or long-haul data transmission. Silicon phonics devices can include active components and passive components. The active components can include modulators and photodetectors. The passive components can include power splitters, polarization splitter-rotators, and input and output couplers. The active and passive devices can be connected to each other using waveguides.

SUMMARY

A waveguide assembly is disclosed and includes a first waveguide and a second waveguide. The first waveguide includes silicon, a first end, a second end, an end member, and one or more tapered members. The end member extends from the first end. The one or more tapered members extend from the end member to the second end. The second waveguide is optically coupled to and spaced away from the first waveguide. The second waveguide includes silicon nitride, a first member, a second member, and a non-tapered member. The non-tapered member extends from the first member to the second member and in parallel with and opposing a portion of the one or more tapered members. An effective refractive index of the non-tapered member matches an effective refractive index of the one or more tapered members at a first plane. The first plane extends through the non-tapered member and the one or more tapered members and perpendicular to a second plane. The second plane extends parallel to a direction of overlap between the first waveguide and the second waveguide.

In other features, the one or more tapered members of the first waveguide includes a first tapered member and a second tapered member. The first tapered member extends from the end member to the second tapered member. The second tapered member extends from the first tapered member to the second end. The non-tapered member extends parallel to the second tapered member.

In other features, a length of the second tapered member is equal to a length of the non-tapered member. In other features, a width of the non-tapered member is greater than widths of the second tapered member. In other features, a width of the non-tapered member is greater than a width of the first tapered member. The width of the first tapered member is greater than widths of the second tapered member.

In other features, a width of the non-tapered member is greater than a width of the end member. The width of the end member is greater than widths of the first tapered member. Widths of the first tapered member are greater than widths of the second tapered member. In other features, sides of the non-tapered member extend parallel to each other from the first member to the second member.

In other features, the first member of the second waveguide is a diverging member having diverging sides diverging towards the non-tapered member. The second member of the second waveguide is a converging member having converging sides converging away from the non-tapered member.

In other features, the first member does not overlap the first waveguide. The second member overlaps one of the one or more tapered members or the one of the one or more tapered members overlaps the second member.

In other features, the one or more tapered members of the first waveguide includes a first tapered member and a second tapered member. The first tapered member extends from the end member to the second tapered member. The second tapered member extends from the first tapered member to the second end. The non-tapered member overlaps the second tapered member or the second tapered member overlaps the non-tapered member.

In other features, the one or more tapered members include tapered sides angled to narrow a width of the first waveguide such that the second end is narrower than the first end.

In other features, the waveguide assembly further includes cladding including silicon dioxide. The first waveguide and the second waveguide are embedded in the cladding and separated from each other by a portion of the cladding.

In other features, a silicon photonics circuit is disclosed and includes: the waveguide assembly; a passive component optically coupled to the first waveguide, the passive component being implemented as a power splitter, a polarization splitter-rotator, or input and output coupler; and an active component optically coupled to the second waveguide, the active component being implemented as a modulator or a photodetector.

In other features, a waveguide assembly is disclosed and includes: an input configured to receive an optical signal; an output configured to output the optical signal; a first waveguide including silicon and one or more tapered members; and a second waveguide. The second waveguide is optically coupled to and spaced away from the first waveguide. The second waveguide including silicon nitride and a non-tapered member. The first waveguide and the second waveguide transfer the optical signal between the input and the output. The non-tapered member extends parallel to and opposes the one or more tapered members. An effective refractive index of the non-tapered member matches an effective refractive index of the one or more tapered members at a first plane. The first plane extends through the non-tapered member and the one or more tapered members and perpendicular to a second plane. The second plane extends parallel to a direction of overlap between the second waveguide and the first waveguide.

In other features, the input is at an end of the first waveguide. One of the one or more tapered members overlaps the non-tapered member or the non-tapered member overlaps the one of the one or more tapered members. The second waveguide does not overlap the end of the first waveguide and the end of the first waveguide does not overlap the second waveguide.

In other features, the input is at an end of the second waveguide. One of the one or more tapered members overlaps the non-tapered member or the non-tapered member overlaps the one of the one or more tapered members. The end of the second waveguide does not overlap the first waveguide and the first waveguide does not overlap the end of the second waveguide.

In other features, the first waveguide includes a first end, a second end, and an end member. The end member extends from the first end. The one or more tapered members extend from the end member to the second end. The second waveguide includes a first member and a second member. The non-tapered member extends from the first member to the second member. The non-tapered member overlaps a portion of the one or more tapered members or the portion of the one or more tapered members overlaps the non-tapered member.

In other features, the one or more tapered members of the first waveguide include a first tapered member and a second tapered member. The first tapered member extends from the end member to the second tapered member. The second tapered member extends from the first tapered member to the second end. The non-tapered member overlaps the second tapered member or the second tapered member overlaps the non-tapered member. In other features, a length of the second tapered member is equal to a length of the non-tapered member.

In other features, the first member of the second waveguide is a diverging member having sides diverging to sides of the non-tapered member. The second member of the second waveguide is a converging member having sides converging to the second end of the second waveguide. The one or more tapered members include tapered sides angled to narrow a width of the first waveguide such that the second end is narrower than the first end.

In other features, a width of the non-tapered member is greater than a width of the end member. The width of the end member is greater than widths of the first tapered member. Widths of the first tapered member are greater than widths of the second tapered member.

In other features, the second waveguide includes a first member and a second member. Sides of the non-tapered member extend parallel to each other and from the first member to the second member.

In other features, the waveguide assembly further includes cladding including silicon dioxide. The first waveguide and the second waveguide are embedded in the cladding and separated from each other by a portion of the cladding.

In other features, a silicon photonics circuit is disclosed and includes: the waveguide assembly; a passive component optically coupled to the first waveguide; and an active component optically coupled to the second waveguide.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

In the drawings, reference numbers may be reused to identify similar and/or identical elements.

DESCRIPTION

Silicon photonics circuits used for broadband telecommunication, data center connectivity and bio-sensing applications include active components and passive components. Waveguide assemblies are used to optically route signals to various active and passive components. One type of waveguide assembly having a monolithic multi-layer silicon photonics stack structure includes a silicon (Si) strip waveguide (referred to herein as "SWG") and a silicon nitride (SiN) strip waveguide (referred to herein as "NWG"), along with metal layers, germanium and oxide layers, and ion plantations for electrical and optical signal transmission on the chip of the waveguide assembly.

Si-to-SiN waveguides used in a broadband communication system for routing signals using a fundamental transverse electric mode TE0 and/or a fundamental transverse magnetic mode TM0. The broadband communication wavelength is over, for example, an O-band (1260-1360 nanometer band) or a C-band (1530-1565 nanometer band). The fundamental modes TE0, TM0 are typically used as opposed to other TE and TM modes to minimize loss and maximize transmission confinement. Transmission confinement refers to the amount (or percentage) of a signal that is confined to a core of a transmission medium versus the amount of the signal that interacts with sidewalls of the transmission medium.

The examples set forth herein include a SiN-to-Si waveguide assembly. The SiN-to-Si waveguide assembly includes an overlapping structure having a parallel sided NWG member and an adjacent tapered SWG member, which are configured and arranged for transitioning light between the NWG and SWG with low transmission loss. The NWG and SWG members have matching effective refractive indices. The SiN-to-Si waveguide assembly exhibits low transmission loss for both TE0 and TM0 modes and is applicable for both C-band and O-band transmissions. Additional features and advantages are further described below.

For coherent signal transmission, both TE0 and TM0 modes are used to transmit polarization independent signals. A significant amount of loss can occur during the transition between the SWG and the NWG due to fabrication variations such as lateral overlay, gap size differences between the waveguides, and changes in critical dimensions of the SWG and NWG. The critical dimension of a waveguide refers to a particular dimension of the waveguide and/or associate dimension of a specific feature of a mask layer used to form the waveguide. As an example, a critical dimension often refers to the smallest dimension of the waveguide, such as width of an end of a tapered member of the waveguide.

A SWG is more sensitive to temperature change than a NWG. The higher the operating temperature, the higher the effective refractive index of a SWG due to a thermo-optical effect. A NWG exhibits minimal change in effective refractive index with increase in temperature due to having a low thermal optics coefficient as compared to that of the SWG. The increase in temperature causes an effective refractive index mismatch between the NWG and SWG, which induces transmission loss due to the transition between the NWG and SWG. Also, the change in effective refractive index changes the wavelength of transmission. Thus, if signals are to be transmitted at a certain wavelength, temperature changes can alter the actual transmitted wavelength, which negatively affects system performance in both signal transmission and reception. Also, passive components are typically designed for operation at a certain wavelength and thus operating temperature change can negatively affect performance of the passive components, and for that reason a NWG can be used for signal routing within a system rather than a SWG. As an example, each degree of temperature change can be a 0.8 nanometer (nm) shift in wavelength. If there is a change in temperature of 10s of degrees, then there is a large wavelength shift. Further if this temperature change and wavelength shift occurs in several components, transmission and reception loss can arise.

A Si-to-SiN waveguide can include a tapered SWG and a tapered NWG. The tapered SWG overlaps the tapered SWG such that the tapered members of the SWG and NWG overlap each other and are narrowing in opposite directions. The narrowest portion of each waveguide is disposed adjacent to or near the widest portion of the other waveguide. This is referred to as an interlevel inverse tapered structure. Waveguide assemblies having an interlevel inverse tapered structure are typically designed for TE0 transmission, but can be used for both TE0 and TM0 transmissions.

Figure 1:
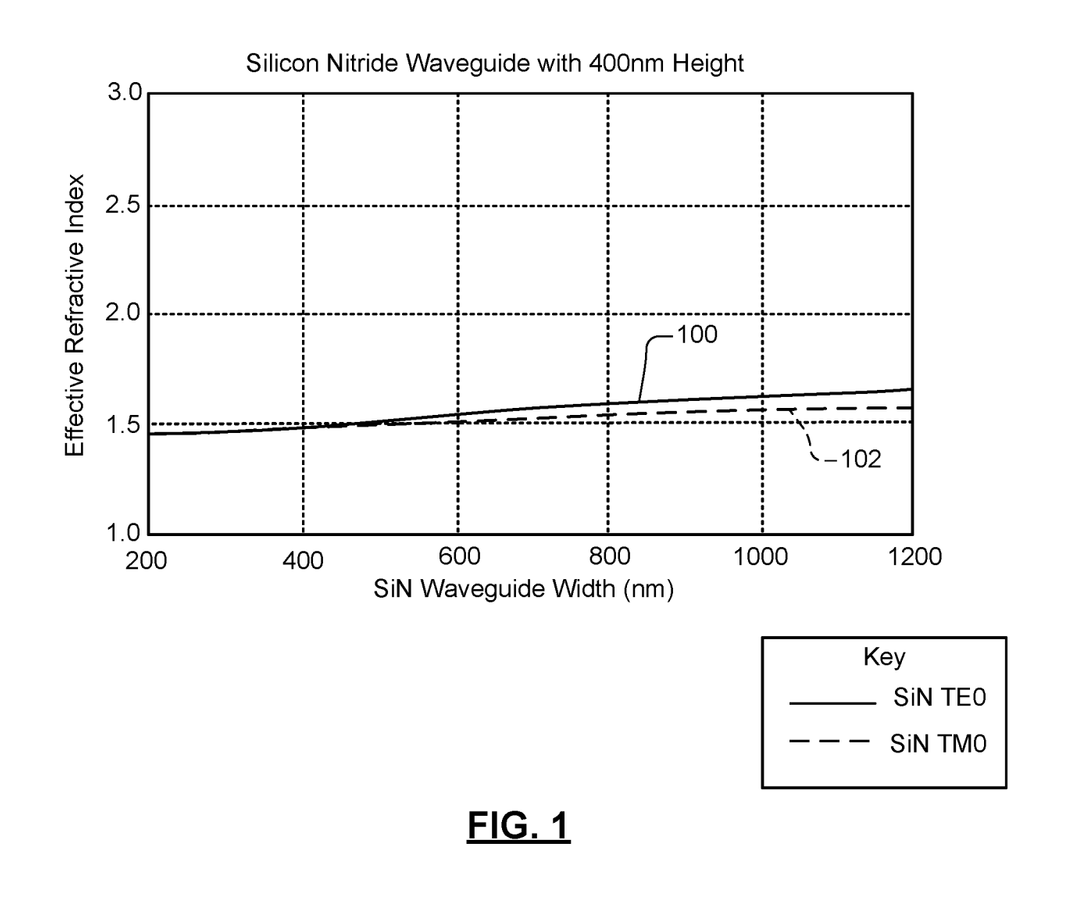
FIG. 1 is a plot of effective refractive index versus width of a silicon nitride waveguide.
Figure 2:
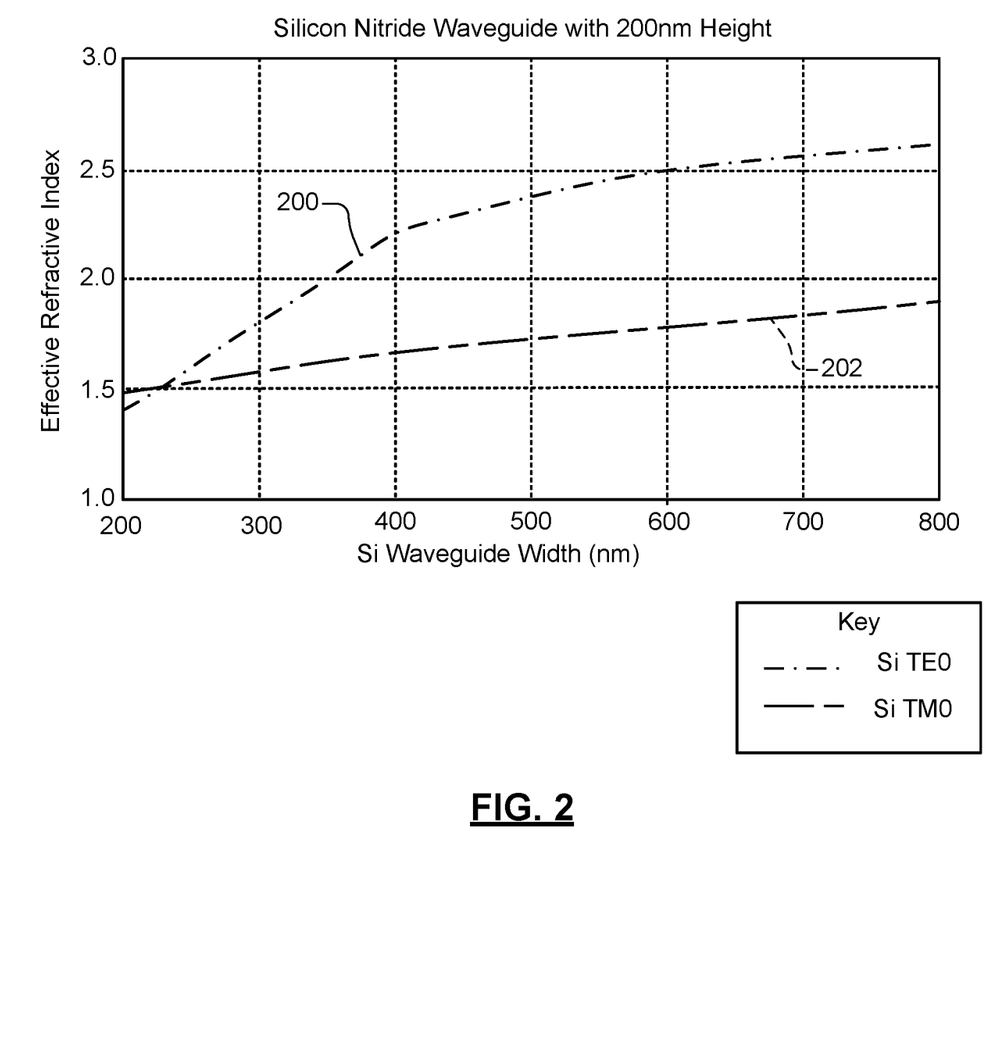
FIG. 2 is a plot of effective refractive index versus width of a silicon waveguide.

A match in effective refractive indices of the SWG and the NWG of the Si-to-SiN waveguide assembly may or may not occur along the interlevel inverse tapered structure depending on fabrication accuracy of the Si-to-SiN waveguide assembly. Effective refractive index refers to a number quantifying a phase delay per unit length in a waveguide, relative to the phase delay in a vacuum. The effective refractive index of a waveguide increases with larger width of that waveguide. This is true for both SWG and NWG and for both TE0 and TM0 modes and is illustrated by the plots of FIGS. 1-2. FIG. 1 shows effective refractive index versus width of a NWG for both TE0 and TM0 modes. In FIG. 1 curves 100, 102 are shown for TE0 and TM0 modes. FIG. 2 shows effective refractive index versus width of a SWG for both TE0 and TM0 modes. In FIG. 2 curves 200, 202 are shown for TE0 and TM0 modes. The plots of FIGS. 1-2 are shown for waveguides having a constant height. As the effective refractive index of the SWG waveguide decreases with smaller width, light transits from the SWG to the NWG, which has an increasing effective refractive index due to a larger and increasing width. Effective refractive index matching refers to when light is transferred from one material (e.g., Si) to another material (e.g., SiN) and effective refractive indices of the materials match for the TE0 and/or TM0 modes.

Manufacturing a waveguide with the interlevel inverse tapered structure to exhibit low-loss transmission for both TE0 and TM0 modes can require high-resolution lithography fabrication. Precise control over fabrication is challenging during mass production using, for example, photolithography in which case there are often variations in fabricated components. As an example, if a critical dimension of a tapered member of a waveguide (e.g., the width of the narrowest portion of the waveguide) is off by ±20 nm, then the rest of the tapered member is typically also off ±20 nm. This can result in there not being a point along the interlevel inverse tapered structure where the effective refractive index of the SWG matches with that of the NWG.

If geometry and locations of tapered members of the SWG and NWG are carefully fabricated to provide effective refractive index matching at a point along the tapered overlapping structure, then cross-sections of the SWG and NWG that have the same effective refractive index that allows light to easily transfer from NWG to SWG and vice versa. As an example, this may occur when a cross-section of the SWG having a width of 270 nm and a cross-section of the NWG having a width of 1000 nm are laterally aligned for TE0 transmission, and where a cross-section of the SWG having a width of 285 nm and a cross-section of the NWG having a width of 980 nm are laterally aligned for TM0 transmission. If a critical dimension of the SWG is off by −20 nm, then there is not a point along the overlapping portions of the SWG and the NWG where the effective refractive index of the SWG and the NWG are matched due to the inverse tapered overlapping relationship of the waveguides. Also, independent of whether the Si-to-SiN waveguide assembly is precisely fabricated, the interlevel inverse tapered structure is sensitive to changes in temperature. Effective refractive indices of the SWG and NWG become mismatched when temperatures, for example, increase from 25° C.-95° C. Thus, interlevel inverse tapered structures require precise manufacturing to provide effective refractive index matching and exhibit shifts in wavelengths due to changes in temperature.

The examples set forth herein include a SiN-to-Si waveguide assembly including a NWG with a non-tapered member adjacent a tapered member of a corresponding SWG. The SiN-to-Si waveguide assembly has an interlevel structure with overlapping waveguides. The non-tapered member of the NWG includes parallel extending sides and overlaps the tapered member of a corresponding SWG. The non-tapered member of the NWG is wider than the widest portion of the tapered member of the SWG. The non-tapered member provides an overlapping portion that has a non-varying and large width such that when an effective refractive index of a SWG changes due to manufacturing variations and/or temperature changes, there remains a point along the overlapping structure where the effective refractive index of the SWG matches with that of the NWG. This match provides low-loss broadband concurrent transmission in both TE0 and TM0 modes. This is true for both C-band and O-band coherent transmissions. No conversion is performed between TE0 and TM0 modes. For example, TE0 mode transmission includes TE0-to-TE0 mode transmission between the NWG and SWG. Similarly, TM0 mode transmission includes TM0-to-TM0 mode transmission between the NWG and SWG.

The configuration of the NWG, including a parallel side structure, width, and length of a non-tapered member, result in a SiN-to-Si waveguide assembly structure that is less sensitive to fabrication tolerances such as lateral overlay of SWG and NWG. Having a straight NWG member (i.e., parallel sided member) adjacent and opposing an inverse tapered SWG member accounts for changes in effective refractive index of silicon during operation due to changes in operating temperatures such as changes between 25-90° C. Also, the large NWG width reduces the effect of imprecise lateral overlay of the NWG and SWG during fabrication.

Figure 3:
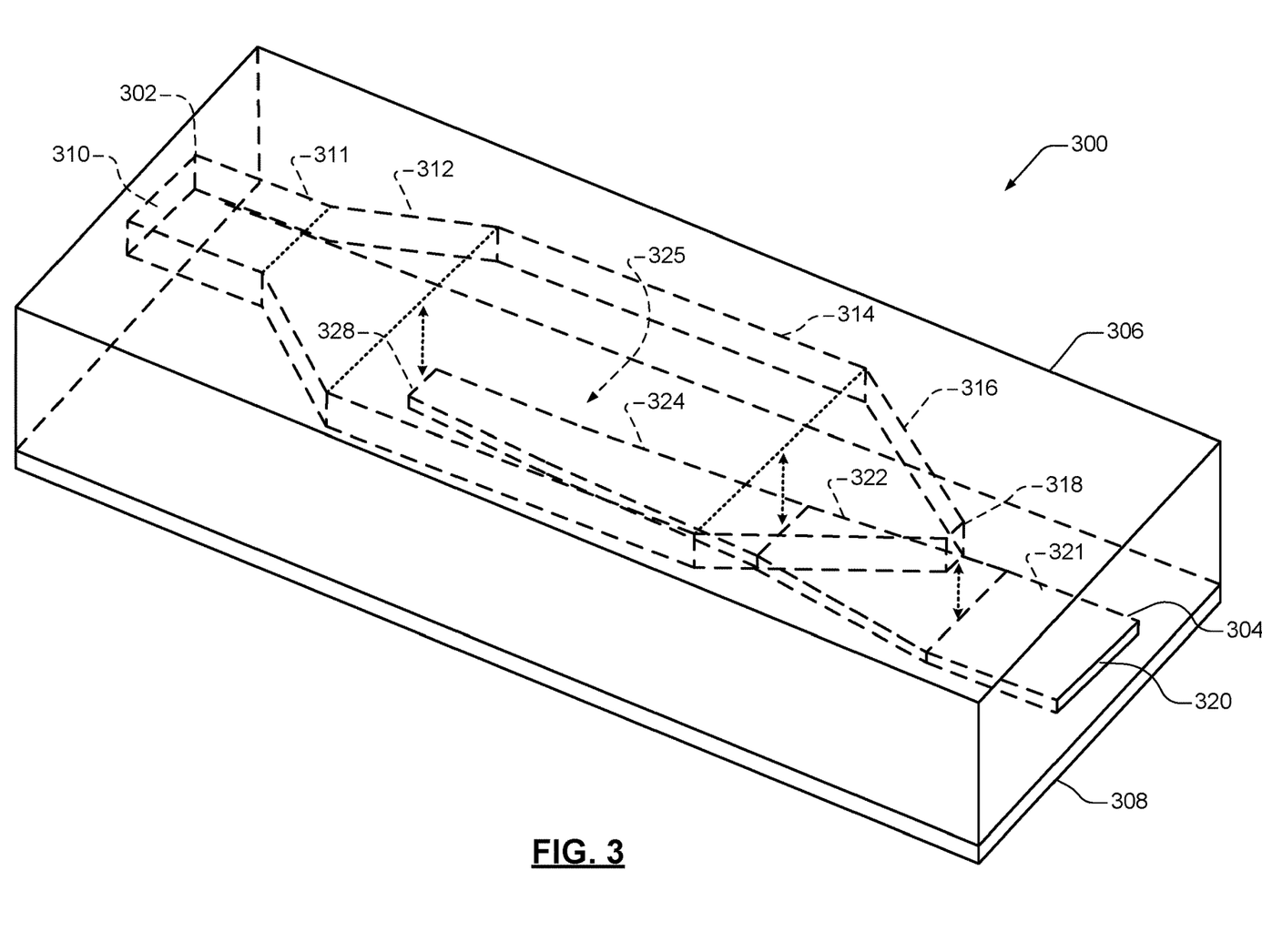
FIG. 3 is a perspective view of an example SiN-to-Si waveguide assembly in accordance with the present disclosure.

FIG. 3 shows a SiN-to-SI waveguide assembly 300 that includes a NWG 302 and a SWG 304. The NWG 302 and the SWG 304 are embedded in silicon dioxide ($SiO_2$) cladding 306. In an embodiment, the NWG 302, SWG 304, and $SiO_2$ cladding 306 are disposed on a substrate 308. The NWG 302 is formed of SiN and the SWG 304 and substrate 308 are formed of silicon. The NWG 302 overlaps the SWG 304 and includes a first end 310, an end member 311, a diverging member 312, a non-tapered member 314, a converging member 316, and a second end 318. The SWG 304 includes a first end 320, an end member 321, a first tapered member 322, a second tapered member 324, and a second end 328. The non-tapered member 314 is disposed over the first tapered member 324. The converging member 316 is disposed over the first tapered member 322.

One of the NWG 302 or the SWG 304 is used as a signal input of the SiN-to-Si waveguide assembly 300 and the other one of the NWG 302 and the SWG 304 is used as a signal output of the SiN-to-Si waveguide assembly. Thus, the first end 310 of the NWG 302 is configured to be implemented as a signal input or a signal output of the SiN-to-Si waveguide assembly 300. Similarly, the first end 320 of the SWG 304 is configured to be implemented as a signal input or a signal output of the SiN-to-Si waveguide assembly 300. The low-loss and temperature insensitive characteristics of the SiN-to-Si waveguide assembly 300 are provided independent of whether the NWG 302 or the SWG 304 is implemented as the signal input.

When the first end 310 is implemented as a signal input, light is transferred from the NWG 302 to the SWG 304 primarily along the second tapered member 324 and some light is transferred along a portion of the first tapered member 322. The amount of light transferred along the converging member 316 to the first tapered member 322 decreases toward the second end 318. This is referred to as "tapering off" the signal transmission between waveguides. The converging shape of the converging member 316 and the shape of the first tapered member 322, having sides tapered in an opposite direction as sides of the converging member 316, prevents reflection of light back into the NWG 302 from the overlapping transition region 325 between the NWG 302 and the SWG 304. The overlapping transition region 325 refers to the region between the non-tapered member 314 and the second tapered member 324. When the second end 318 is implemented as a signal input, light is transferred from the NWG 302 to the SWG 304 primarily along the second tapered member 324 and some light is transferred along a portion of the first tapered member 322. The amount of light transferred along the first tapered member 322 to the converging member 316 increases toward the second tapered member 324.

The SiN-to-Si waveguide assembly 300 is configured for coherent modulation including both amplitude and phase to carry information using both TE0 and TM0 polarizations. The ability to transfer signals between NWG and SWG allow for low-loss and temperature insensitive signal routing in the NWG, and active modulation and detection on the SWG material. The SiN-to-Si waveguide assembly 300 includes waveguides with no irregular shaped members such as wing-shaped, parabolic shaped, exponential-shaped, trapezoidal-shaped, and/or diamond-shaped structures. The NWG 302 has large dimensions as compared to dimensions of the SWG 304. The simplicity in layout and shapes of the NWG 302 and SWG 304 and the large dimensions of the NWG 302 result in a waveguide assembly that is: insensitive to lateral overlay variations during manufacturing; insensitive to temperature changes during operation; and provides effective refractive index matching for manufactured versions of the SiN-to-Si waveguide assembly 300 having different critical dimensions, which can occur from deep ultraviolet photolithography fabrication of the SiN-to-Si waveguide assembly 300. The structure of the SiN-to-Si waveguide assembly 300 is able to transmit concurrently data signals in TE0 and TM0 modes from the first end 310 of the NWG 302 to the first end 320 of the SWG 304 and vice versa with low loss.

Although the NWG 302 is shown and primarily described as being disposed over and overlapping the SWG 304, the SWG 304 may be disposed over and overlapping the NWG 302. For example, in one embodiment, the arrangement of the waveguides 302, 304 is flipped over relative to the substrate 308 such that the non-tapered member 314 is disposed between the second tapered member 324 and the substrate 308. In this example arrangement, the SWG 304 is disposed above the substrate 308 and the NWG 302 is disposed above the SWG 304.

Figure 4:
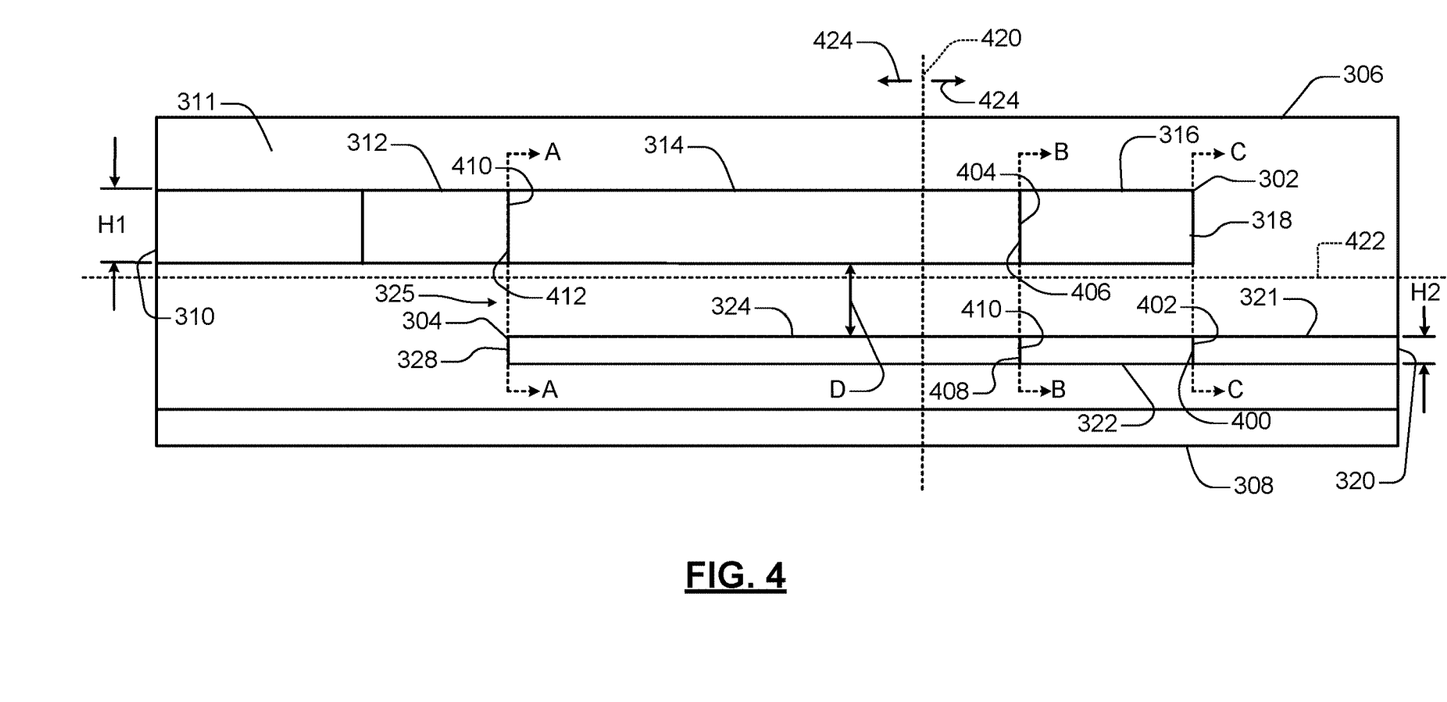
FIG. 4 is a side view of the SiN-to-Si waveguide assembly of FIG. 3.

FIG. 4 shows the SiN-to-Si waveguide assembly 300 of FIG. 3 including the NWG 302, the SWG 304, the $SiO_2$ cladding 306, and substrate 308. The NWG 302 includes the end member 311, the diverging member 312, the non-tapered member 314 and the converging member 316. The SWG 304 includes the end member 321 and tapered members 322, 324. The second end 318 is laterally aligned with each of abutting ends 400, 402 respectively of the end member 321 and the first tapered member 322. Each of abutting ends 404, 406 respectively of the non-tapered member 314 and the converging member 316 is laterally aligned with each of abutting ends 408, 410 of the first and second tapered members 322, 324. Each of abutting ends 410, 412 respectively of the diverging member 312 and the non-tapered member 314 is laterally aligned with the second end 328.

A height H1 (or thickness) of the NWG 302 and a height H2 (or thickness) of the SWG 304 are shown. In an embodiment, the height H1 is greater than the height H2. In an embodiment, the height H2 is 200-300 nm. In an embodiment, the height H2 is 220 nm. In an embodiment, the height H2 is 2-4 times the height H1. A distance between the NWG 302 and the SWG 304 is designated D, which is height of the overlapping transition region 325. In one embodiment, the distance D is 50-100 nm.

Figure 5:
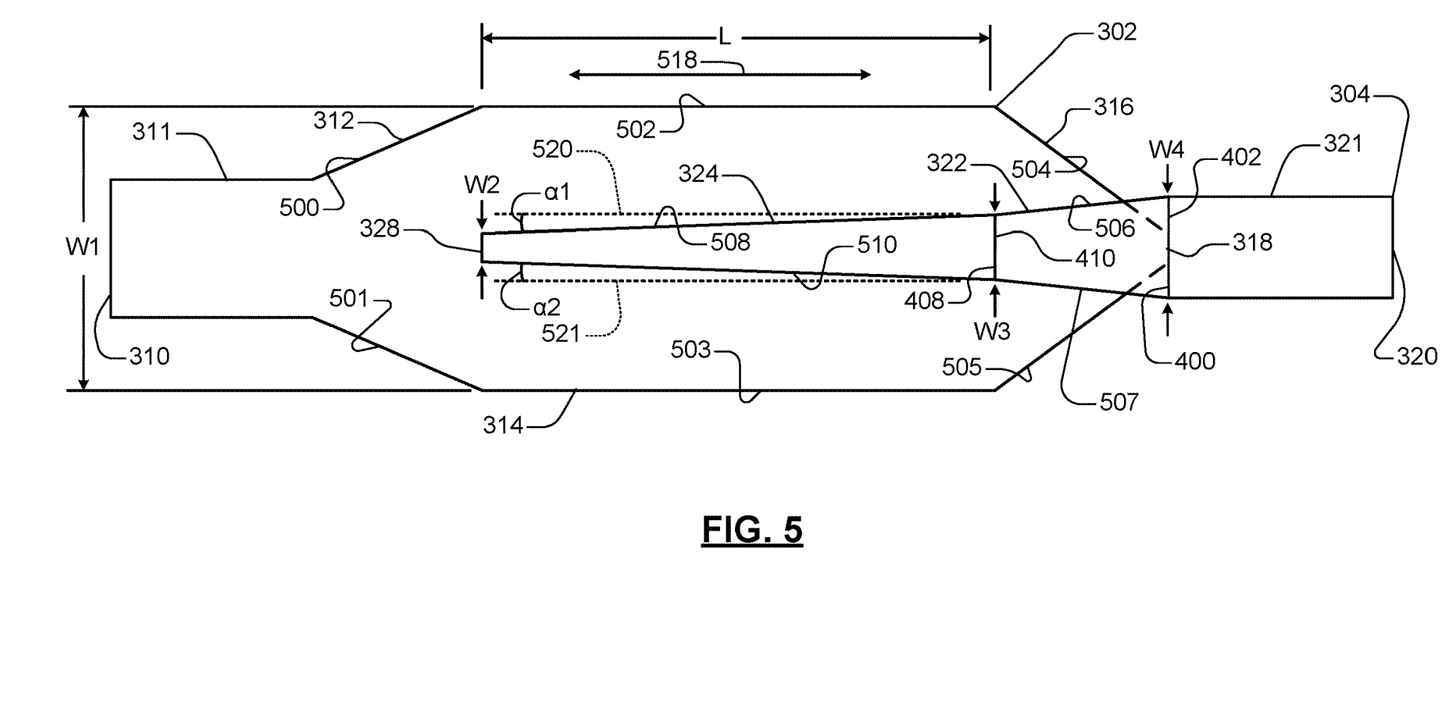
FIG. 5 is a bottom view of a SiN waveguide and a Si waveguide of the SiN-to-Si waveguide assembly of FIG. 3.

FIG. 5 shows the NWG 302 and the SWG 304 of the SiN-to-Si waveguide assembly 300 of FIG. 3. The NWG 302 includes the end member 311, the diverging member 312, the non-tapered member 314 and the converging member 316. The SWG 304 includes the end member 321 and tapered members 322, 324. The diverging member 312 has diverging sides 500, 501. The non-tapered member 314 has parallel sides 502, 503. The converging member 316 has converging sides 504, 505. The first tapered member 322 has tapered sides 506, 507. The second tapered member 324 has tapered sides 508, 510. A width W1 and a length L of the non-tapered member 314 and a width W2 of the second end 328 are shown. Widths of abutting ends 408, 410 of the tapered members 322, 324 are the same and designated W3. A length of the second tapered member 324 is the same as the length L of the non-tapered member 314. Widths of abutting ends 400, 402 are the same and designated W4. W1 is greater than W4, which is greater than W3. W3 is greater than W2. In an embodiment, W1 is 4-12 times W2. In an embodiment, W4 is 2-5 times W2.

Referring to FIGS. 4 and 5, coupling efficiency of the TE0 and TM0 modes between the NWG 302 and the SWG 304 is based on the length L, the width W1, and the widths W2, W3 and W4. These dimensions are such that at a point along the non-tapered member 314 and the second tapered member 324 effective refractive index matching occurs between the NWG 302 and the SWG 304. This point of matching refers to a first plane 420 extending perpendicular a second plane 422, where the second plane 422 extends parallel to a direction of overlap of the NWG 302 relative to the SWG 304. The direction of overlap is represented of double arrow 518. The direction of overlap depends on whether the SiN-to-Si waveguide assembly 300 is arranged as shown in FIG. 3 or if the waveguides 302, 304 are flipped over such that the NWG 302 is disposed between the SWG 304 and the substrate 308 of FIG. 3. The location of the first plane 420 along the members 314, 324 can change from assembly-to-assembly, as indicated by arrows 424 and is based on precision of fabrication of the dimensions of the members 314, 324. In an embodiment, the length L is 200-1000 nm. The longer the length L, the longer the second tapered member 324. In an embodiment, the length L is set based on the distance D of FIG. 4 between the NWG 302 and the SWG 304. The width of the second tapered member 324 at any point along the second tapered member 324 is based on taper angles α1, α2 respectively of the sides 508, 510 relative to lines 520, 521, which extend parallel to the sides 502, 503. In an embodiment, the first taper angle α1 is equal to the second taper angle α2.

When a critical dimension of the SWG 304 varies, for example, when W2 varies by ±20 nm from a set value during fabrication, effective refractive index matching still occurs along the members 314, 324 because the width W1 does not vary along the length L. The point along the length L of the NWG 302 where effective refractive index matching occurs is different for different values of the critical dimension due to the changes in W2 and/or W3 and/or changes in slopes of tapered sides 508, 510 of the tapered members 322, 324.

Figure 6:
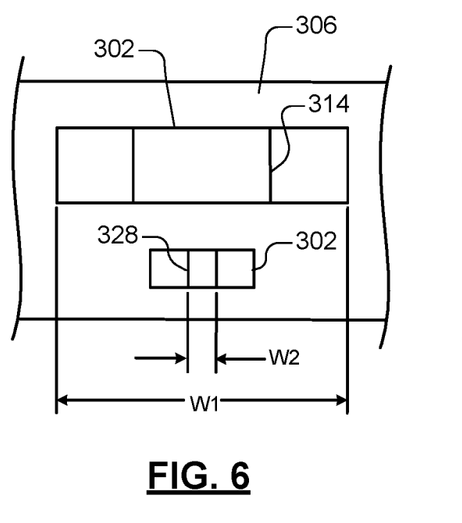
FIG. 6 is a cross-sectional view of a first portion of the SiN-to-Si waveguide assembly of FIG. 3 through section line A-A of FIG. 4.

FIG. 6 shows a first cross-sectional portion of the SiN-to-Si waveguide assembly 300 of FIG. 3 through section line A-A of FIG. 4. The NWG 302 and SWG 304 are shown embedded in the SiO$_2$ cladding 306. The width W1 of the non-tapered member 314 and the width W2 of the second end 328 are shown.

Figure 7:
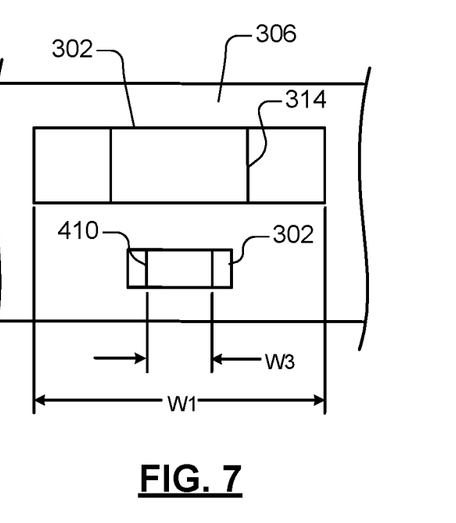
FIG. 7 is a cross-sectional view of a second portion of the SiN-to-Si waveguide assembly of FIG. 3 through section line B-B of FIG. 4.

FIG. 7 shows a second cross-sectional portion of the SiN-to-Si waveguide assembly 300 of FIG. 3 through section line B-B of FIG. 4. The NWG 302 and SWG 304 are shown embedded in the SiO$_2$ cladding 306. The width W1 of the non-tapered member 314 and the width W3 of the end 410 of the first tapered member 322 are shown.

Figure 8:
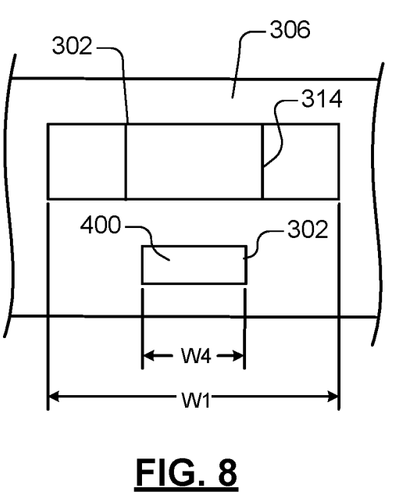
FIG. 8 is a cross-sectional view of a third portion of the SiN-to-Si waveguide assembly of FIG. 3 through section line C-C of FIG. 4.

FIG. 8 shows a third cross-sectional portion of the SiN-to-Si waveguide assembly 300 of FIG. 3 through section line C-C of FIG. 4. The NWG 302 and SWG 304 are shown embedded in the SiO$_2$ cladding 306. The width W1 of the non-tapered member 314 and the width W4 of the end 400 of the end member 321 are shown.

Figure 9:
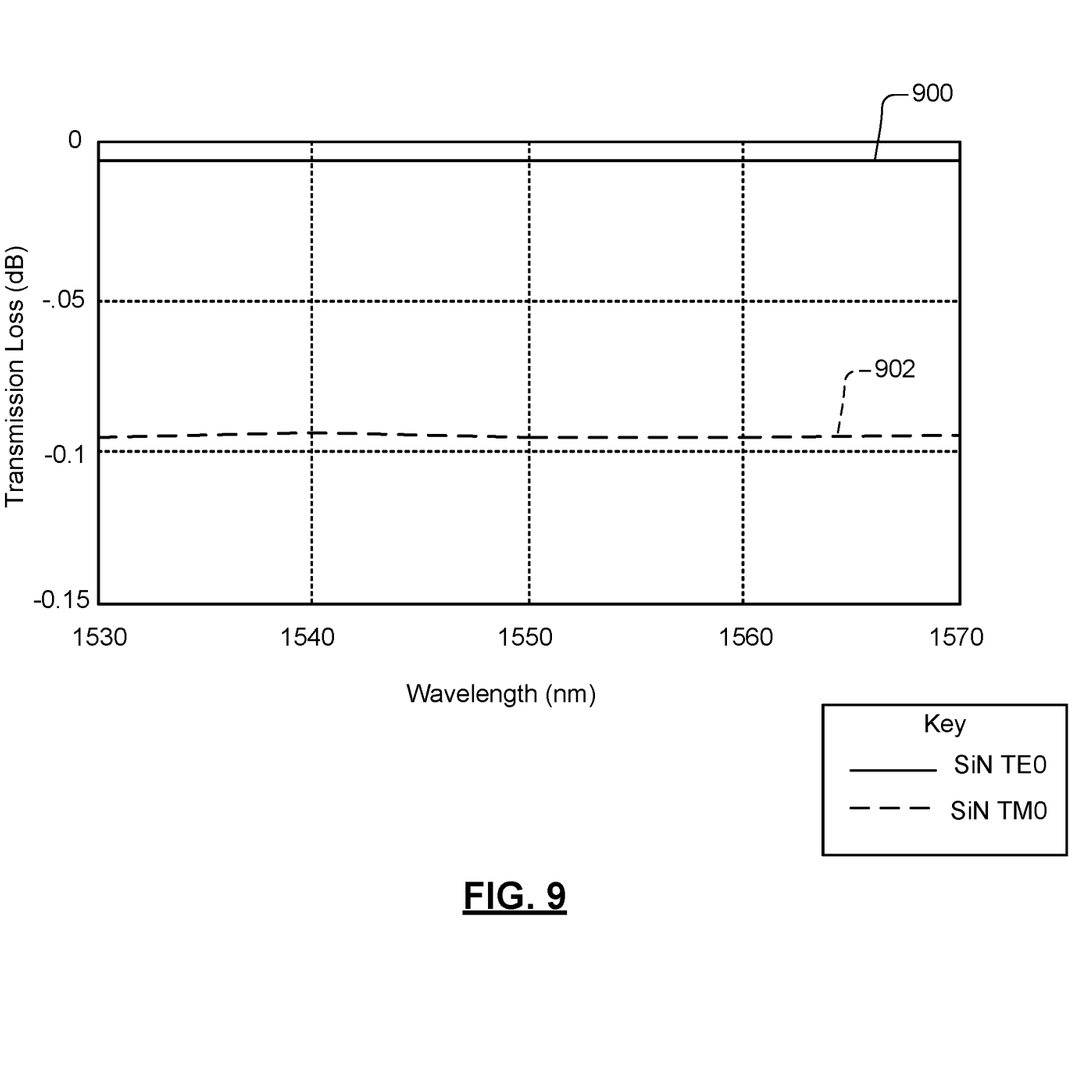
FIG. 9 is an example plot of transmission loss versus wavelength for the SiN-to-Si waveguide assembly of FIG. 3.

FIG. 9 shows a plot of transmission loss versus wavelength for the SiN-to-Si waveguide assembly 300 of FIG. 3. Curves 900 and 902 are shown for TE0 and TM0 modes. FIG. 9 is provided as an example of the low transmission loss for a version of the SiN-to-Si waveguide assembly 300.

Figure 10:
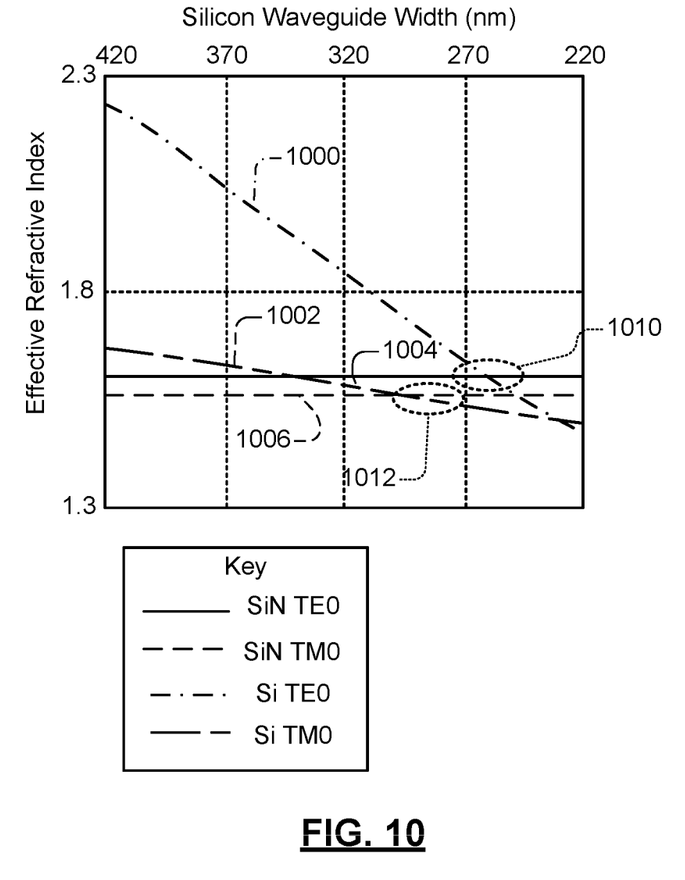
FIG. 10 is an example plot of effective refractive index versus width of the silicon waveguide of a first version of the SiN-to-Si waveguide assembly of FIG. 3 with a first critical dimension.

FIG. 10 shows a plot of effective refractive index versus width of the SWG 304 of a first version of the SiN-to-Si waveguide assembly 300 of FIG. 3 with a first critical dimension. The first critical dimension refers to when fabrication is precise and there is no variation between the actual value of the critical dimension and a set (or requested) value for that critical dimension. Curves 1000 and 1002 are shown for the NWG 302 operating in TE0 and TM0 modes. Curves 1004 and 1006 are shown for the SWG 304 operating in TE0 and TM0 modes.

Figure 11:
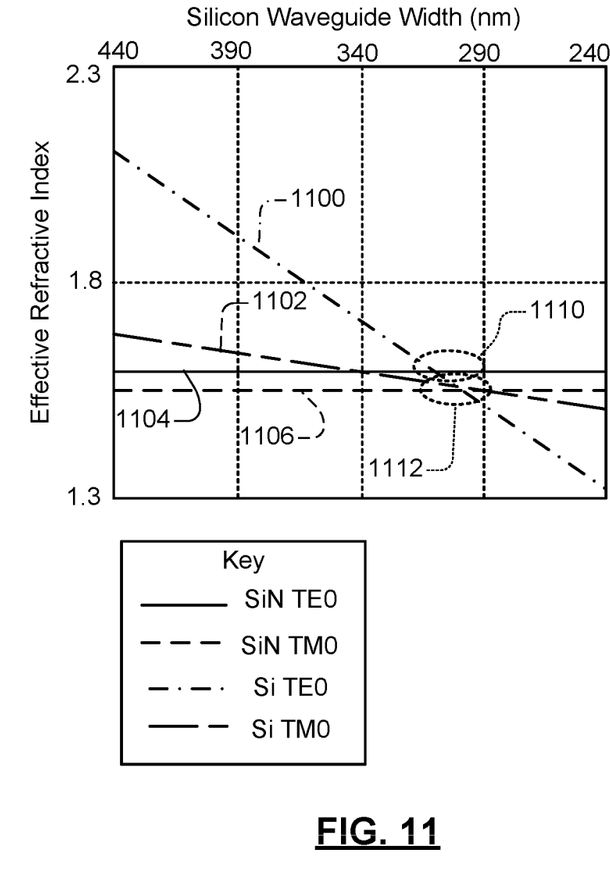
FIG. 11 is an example plot of effective refractive index versus width of a second version of the silicon waveguide of the SiN-to-Si waveguide assembly of FIG. 3 with a second critical dimension.

FIG. 11 shows a plot of effective refractive index versus width of a second version of the SWG 304 of the SiN-to-Si waveguide assembly 300 of FIG. 3 with a second critical dimension. The second critical dimension refers to the same critical dimension as the first critical dimension referred to above for FIG. 10 but has a different value than the value of the first critical dimension. As an example, the first critical dimension may refer to the width W2 of the second end 328 and be between 150 nm and the second critical dimension may also refer to the width W2 and be equal to the value of the first critical dimension minus 20 nm (or 130 nm). The value of the second critical dimension is thus different than the value of the first critical dimension. Curves 1100 and 1102 are shown for the NWG 302 operating in TE0 and TM0 modes. Curves 1104 and 1106 are shown for the SWG 304 operating in TE0 and TM0 modes.

The width of the SiN waveguide 302 remains the same width for the length L of the non-tapered member 314 and thus for this section of the SiN-to-Si waveguide assembly 300, the only dimension that changes is the width of the second tapered member 324. FIG. 10 shows effective refractive index matching windows 1010, 1012 respectively for the NWG 302 and the SWG 304. FIG. 11 shows effective refractive index matching windows 1110, 1112 respectively for the NWG 302 and the SWG 304. As an example and referring to FIG. 10, the effective refractive index matching occurs when the width of the SWG 304 is 260 nm and the width of the NWG 302 is 1100 nm for TE0 transmission, and the width of the SWG 304 is 285 nm and the width of the NWG 302 is 1100 nm for TM0 transmission. If as a result of fabrication, the critical dimensions of the SWG 304 is −20 nm smaller, then effective refractive index matching still occurs due to i) the changing and increasing width of the SWG 304, and ii) the unchanging width of the NWG 302. The effective refractive index of SWG 304 would still match the effective refractive index of the NWG 302 for TE0 transmission at the point at which the width of the SWG 304 is 320 nm, and match that of the NWG 302 for TM0 transmission at the point at which the width of the SWG 304 is 305 nm.

The SiN-to-Si waveguide assemblies disclosed herein are suitable for broadband signal transmission in both C-band and O-bands and exhibit low loss for concurrent data transmission in both TE0 and TM0 modes. The SiN-to-Si waveguide assemblies can be fabricated using high production deep ultraviolet lithography tools, where the minimum feature sizes of produced parts are 150-200 nm. High production referring to fabrication of a high number of parts within a short period of time with minimal costs. The SiN-to-Si waveguide assemblies do not require small features sizes of less than 180-200 nm.

The ability to transfer signals between NWG and SWG allow for low-loss and non-temperature sensitive routing in the NWG, and active modulation and detection on the SWG material for coherent transmission.

Figure 12:
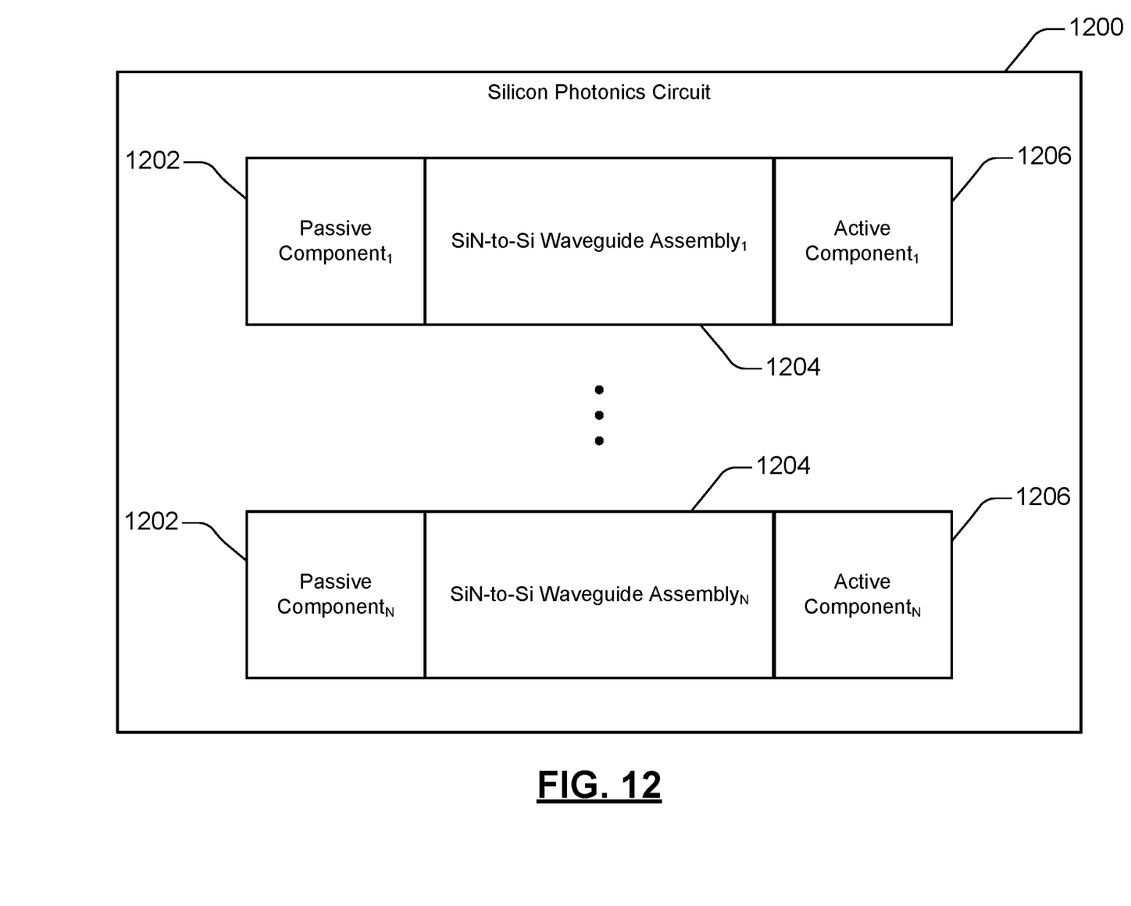
FIG. 12 is a functional block diagram of a silicon photonics circuit including SiN-to-Si waveguide assemblies in accordance with the present disclosure.

FIG. 12 shows a silicon photonics circuit 1200 that includes passive components 1202, SiN-to-SI waveguide assemblies 1204 and active components 1206. The passive components 1202 may refer to any passive components referred to herein. The SiN-to-Si waveguide assemblies 1204 are configured the same or similarly as the SiN-to-Si waveguide assembly 300 of FIGS. 3-5. The active components 1206 may refer to any active components referred to herein. To minimize size of the silicon photonics circuit 1200, the number of components coupled to a NWG is minimized by connecting active components to SWGs and passive components to NWGs. Although Si exhibits higher transmission loss than SiN, since Si exhibits better transmission confinement, overall structure size is smaller and associated transmission distances are smaller and thus overall transmission loss is low. Transitions between the NWGs and SWGs of the SiN-to Si waveguide assemblies 1204 allows for the use of NWGs for low-loss light propagation of the passive components 1206, while SWGs are used for the active components 1202. Compensating for different wavelength shifts can require additional complex and/or costly circuitry. Also, signal transmission for the passive components 1202 is implemented in SiN and signal transmission of the active components 1206 is implemented in Si to minimize the amount of change in wavelength and circuit complexity and costs. Although Si is more sensitive to changes in temperature, in an embodiment, the active components 1206 include phase tuning devices to compensate for changes in temperature.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between circuit elements, layers, waveguides, etc.) are described using various terms, including "connected," "coupled," "adjacent," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

Although the terms first, second, third, etc. may be used herein to describe various circuit elements, components, and/or waveguides, these circuit elements, components, and/or waveguides should not be limited by these terms, unless otherwise indicated. These terms may be only used to distinguish one circuit element, component, and/or waveguide from another circuit element, component, and/or waveguide. Terms such as "first," "second," and other numerical terms when used herein do not imply a sequence or order unless clearly indicated by the context. Thus, a first circuit element, component, and/or waveguide could be termed a second circuit element, component, and/or waveguide without departing from the teachings of the example embodiments.

What is claimed is:

1. A waveguide assembly comprising:
    a first waveguide having at least a portion formed of silicon, the first waveguide comprising a first end, a second end, an end member, and one or more tapered members, the end member extending from the first end, and the one or more tapered members extending from the end member to the second end; and
    a second waveguide optically coupled to and spaced away from the first waveguide, the second waveguide comprising silicon nitride, a first member, a second member, and a non-tapered member, the non-tapered member extending from the first member to the second member and in parallel with and opposing a portion of the one or more tapered members, an effective refractive index of the non-tapered member matching an effective refractive index of the one or more tapered members at a first plane, the first plane extending through the non-tapered member and the one or more tapered members and perpendicular to a second plane, and the second plane extending parallel to a direction of overlap between the first waveguide and the second waveguide.

2. The waveguide assembly of claim 1, wherein:
    the one or more tapered members of the first waveguide comprise a first tapered member and a second tapered member, the first tapered member extends from the end member to the second tapered member, and the second tapered member extends from the first tapered member to the second end; and
    the non-tapered member extends parallel to the second tapered member.

3. The waveguide assembly of claim 2, wherein a length of the second tapered member is equal to a length of the non-tapered member.

4. The waveguide assembly of claim 2, wherein a width of the non-tapered member is greater than widths of the second tapered member.

5. The waveguide assembly of claim 2, wherein:
a width of the non-tapered member is greater than a width of the first tapered member; and
the width of the first tapered member is greater than widths of the second tapered member.

6. The waveguide assembly of claim 2, wherein:
a width of the non-tapered member is greater than a width of the end member;
the width of the end member is greater than widths of the first tapered member; and
widths of the first tapered member are greater than widths of the second tapered member.

7. The waveguide assembly of claim 1, wherein sides of the non-tapered member extend parallel to each other from the first member to the second member.

8. The waveguide assembly of claim 1, wherein:
the first member of the second waveguide is a diverging member having diverging sides diverging towards the non-tapered member; and
the second member of the second waveguide is a converging member having converging sides converging away from the non-tapered member.

9. The waveguide assembly of claim 1, wherein the one or more tapered members comprising tapered sides angled to narrow a width of the first waveguide such that the second end is narrower than the first end.

10. The waveguide assembly of claim 1, further comprising cladding comprising silicon dioxide,
wherein the first waveguide and the second waveguide are embedded in the cladding and separated from each other by a portion of the cladding.

11. A silicon photonics circuit comprising:
the waveguide assembly of claim 1;
a passive component optically coupled to the first waveguide, the passive component being implemented as a power splitter, a polarization splitter-rotator, or input and output coupler; and
an active component optically coupled to the second waveguide, the active component being implemented as a modulator or a photodetector.

12. The waveguide assembly of claim 1, wherein a distance between the first waveguide and the second waveguide is greater than 0.

13. The waveguide assembly of claim 1, wherein a distance between the first waveguide and the second waveguide is 50-100 nanometers.

14. The waveguide assembly of claim 1, further comprising a silicon oxide cladding layer disposed between the first waveguide and the second waveguide.

15. The waveguide assembly of claim 1, further comprising a silicon oxide cladding layer disposed between the one or more tapered members and the non-tapered member.

16. The waveguide assembly of claim 1, wherein a width of the non-tapered member is greater than an overall width of the first waveguide.

17. The waveguide assembly of claim 1, wherein the first waveguide is formed of silicon.

18. A waveguide assembly comprising:
a first waveguide comprising silicon, a first end, a second end, an end member, and one or more tapered members, the end member extending from the first end, and the one or more tapered members extending from the end member to the second end; and
a second waveguide optically coupled to and spaced away from the first waveguide, the second waveguide comprising silicon nitride, a first member, a second member, and a non-tapered member, the non-tapered member extending from the first member to the second member and in parallel with and opposing a portion of the one or more tapered members, an effective refractive index of the non-tapered member matching an effective refractive index of the one or more tapered members at a first plane, the first plane extending through the non-tapered member and the one or more tapered members and perpendicular to a second plane, and the second plane extending parallel to a direction of overlap between the first waveguide and the second waveguide,
wherein
the first member of the second waveguide is a diverging member having diverging sides diverging towards the non-tapered member,
the second member of the second waveguide is a converging member having converging sides converging away from the non-tapered member,
the first member does not overlap the first waveguide, and
the second member overlaps one of the one or more tapered members or the one of the one or more tapered members overlaps the second member.

19. The waveguide assembly of claim 18, wherein:
the one or more tapered members of the first waveguide comprise a first tapered member and a second tapered member;
the first tapered member extends from the end member to the second tapered member;
the second tapered member extends from the first tapered member to the second end; and
the non-tapered member overlaps the second tapered member or the second tapered member overlaps the non-tapered member.

20. A waveguide assembly comprising:
an input configured to receive an optical signal;
an output configured to output the optical signal;
a first waveguide having at least a portion formed of silicon, the first waveguide comprising one or more tapered members; and
a second waveguide optically coupled to and spaced away from the first waveguide, the second waveguide comprising silicon nitride and a non-tapered member, the first waveguide and the second waveguide transferring the optical signal between the input and the output, the non-tapered member extending parallel to and opposing the one or more tapered members, an effective refractive index of the non-tapered member matching an effective refractive index of the one or more tapered members at a first plane, the first plane extending through the non-tapered member and the one or more tapered members and perpendicular to a second plane, and the second plane extending parallel to a direction of overlap between the first waveguide and the second waveguide.

21. The waveguide assembly of claim 20, wherein:
the input is at an end of the first waveguide;
one of the one or more tapered members overlaps the non-tapered member or the non-tapered member overlaps the one of the one or more tapered members; and
the second waveguide does not overlap the end of the first waveguide and the end of the first waveguide does not overlap the second waveguide.

22. The waveguide assembly of claim 20, wherein:
the input is at an end of the second waveguide;
one of the one or more tapered members overlaps the non-tapered member or the non-tapered member overlaps the one of the one or more tapered members; and
the end of the second waveguide does not overlap the first waveguide and the first waveguide does not overlap the end of the second waveguide.

23. The waveguide assembly of claim 20, wherein:
the first waveguide comprises a first end, a second end, and an end member;
the end member extends from the first end;
the one or more tapered members extend from the end member to the second end;
the second waveguide comprises a first member and a second member;
the non-tapered member extends from the first member to the second member; and
the non-tapered member overlaps a portion of the one or more tapered members or the portion of the one or more tapered members overlaps the non-tapered member.

24. The waveguide assembly of claim 23, wherein:
the one or more tapered members of the first waveguide comprise a first tapered member and a second tapered member, the first tapered member extends from the end member to the second tapered member, and the second tapered member extends from the first tapered member to the second end; and
the non-tapered member overlaps the second tapered member or the second tapered member overlaps the non-tapered member.

25. The waveguide assembly of claim 24, wherein a length of the second tapered member is equal to a length of the non-tapered member.

26. The waveguide assembly of claim 24, wherein:
the first member of the second waveguide is a diverging member having sides diverging to sides of the non-tapered member;
the second member of the second waveguide is a converging member having sides converging to the second end of the second waveguide; and
the one or more tapered members comprise tapered sides angled to narrow a width of the first waveguide such that the second end is narrower than the first end.

27. The waveguide assembly of claim 24, wherein:
a width of the non-tapered member is greater than a width of the end member;
the width of the end member is greater than widths of the first tapered member; and
widths of the first tapered member are greater than widths of the second tapered member.

28. The waveguide assembly of claim 20, wherein:
the second waveguide comprises a first member and a second member; and
sides of the non-tapered member extend parallel to each other and from the first member to the second member.

29. The waveguide assembly of claim 20, further comprising cladding comprising silicon dioxide,
wherein the first waveguide and the second waveguide are embedded in the cladding and separated from each other by a portion of the cladding.

30. A silicon photonics circuit comprising:
the waveguide assembly of claim 20;
a passive component optically coupled to the first waveguide; and
an active component optically coupled to the second waveguide.

* * * * *